United States Patent [19]

Hwang

[11] 4,338,919

[45] Jul. 13, 1982

[54] SOLAR COLLECTOR SYSTEM EMPLOYING PARTICULATE ENERGY COLLECTING MEDIA

[75] Inventor: Charles C. Hwang, Pittsburgh, Pa.

[73] Assignee: University of Pittsburgh, Pittsburgh, Pa.

[21] Appl. No.: 170,644

[22] Filed: Jul. 21, 1980

[51] Int. Cl.³ .............................................. F24J 3/02
[52] U.S. Cl. .................................. 126/435; 126/436; 126/900
[58] Field of Search ............... 126/435, 438, 432, 436, 126/900; 198/711, 712, 713, 716, 733

[56] References Cited

U.S. PATENT DOCUMENTS

| 1,678,711 | 7/1928 | Shipman | 34/93 |
| 2,595,941 | 5/1952 | Hapman | 198/733 |
| 3,908,632 | 9/1975 | Poulsen | 126/435 |
| 3,972,316 | 8/1976 | Alkasab | 126/435 |
| 4,055,948 | 11/1977 | Kraus et al. | 126/438 |
| 4,077,849 | 3/1978 | Ziehm, Jr. | 126/432 |
| 4,104,883 | 8/1978 | Naef | 165/107 R |

FOREIGN PATENT DOCUMENTS

| 2825775 | 12/1979 | Fed. Rep. of Germany | 126/422 |
| 1122922 | 9/1956 | France | 198/716 |

Primary Examiner—James C. Yeung
Attorney, Agent, or Firm—Buell, Blenko, Ziesenheim & Beck

[57] ABSTRACT

A solar collector system including a particulate energy collecting medium for receiving solar energy. The medium cooperates with a solar collector which is adapted to expose the particulate energy collecting medium to solar energy. A heat exchanger permits transfer of the heat from the particulate energy collecting medium to another medium and transport means deliver the particulate energy collecting medium from the solar collector to the heat exchanger and subsequently returns it to the solar collector. An energy storage reservoir may be provided.

In one embodiment a conveyor system transports the particulate energy collecting medium within a passageway system. The conveyor may be an endless cable having a plurality of conveyor elements having recesses for receipt of the particulate energy collecting medium.

13 Claims, 5 Drawing Figures

SOLAR COLLECTOR SYSTEM EMPLOYING PARTICULATE ENERGY COLLECTING MEDIA

BACKGROUND OF THE INVENTION

1. Field of the Invention

This invention relates to solar collector systems and, more specifically, relates to such systems employing particulate energy collecting media.

2. Description of the Prior Art

Various means for attempting to make use of solar energy have been known. As in recent years, the world has experienced a diminished supply of energy resources, solar systems which dependably, economically and efficiently make use of solar energy have been needed.

In general, known solar energy systems employ air, water or an aqueous solution as the means for absorbing solar energy and subsequently through means of a heat exchanger, delivering the absorbed solar heat to a different medium. Frequently, the air or water which absorbs heat directly from exposure to solar radiation, by means of a heat exchanger, delivers the heat to a storage medium with the ultimate heat receiving zone receiving heat from the storage medium.

Among the problems encountered with the water or aqueous solution heat collectors are freezing, evaporation, condensation, and undesired leakage resulting in damage to the building and its contents. Any of these undesired events can result in failure of the system, or at minimum, substantially reduced efficiency. Among the problems with air systems are inefficient heat transfer between the solar collector and the air and between the air and the energy storage medium.

It has been suggested to employ an endless belt which is adapted to, in one zone, receive energy from exposure to solar radiation and, in another zone, to transfer the heat to either air or water which is disposed in an adjacent chamber. In such a system the belt serves as the collector medium and the air or water as the storage medium. See U.S. Pat. No. 3,972,316.

U.S. Pat. No. 4,077,849 is directed toward the use of solar energy in desalination apparatus. It discloses the use of metal balls or cylindrical rollers which absorb solar energy and are subsequently transported to a vaporization chamber wherein they are exposed to sea water or other saline water.

U.S. Pat. No. 4,055,948 discloses a solar thermal-radiation absorption and conversion system. A transparent heat transfer fluid moves suspended particles through an exposure zone. This patent contemplates filling the entire space of the collector section with a liquid. As a result, undesired heat loss to the collector will exist through such liquid contact. In addition, the system of this disclosure remains vulnerable to undesired leakage, freezing, and evaporation.

There remains, therefore, a need for an efficient thermal collection system which will be economical to adopt and use, efficient in operation and avoid a number of the above-described problems.

SUMMARY OF THE INVENTION

The present invention has met the above-described need by providing a solar collector system which employs particulate energy collection means for receiving solar energy. Solar collector means provide for exposure of the particulate energy collecting means to the solar energy. Heat exchanger means permit transfer of heat from the particulate energy collecting means to another medium. Transport means serve to deliver the particulate energy collection means from the solar collector means to the heat exchanger means and back.

Among the preferred versions of heat exchanger means employed in the invention are fluidized bed means.

In a preferred embodiment, closed passageway means cooperate with conveyor means so to facilitate transport of the particulate energy collecting means through a closed system. A preferred form of conveyor means includes an endless cable to which are attached a plurality of conveyor elements having recesses for receipt of a particulate energy collecting means.

It is an object of this invention to provide a solar collector system which employs particulate matter as both the energy collecting means and the energy storage means.

It is a further object of this invention to provide a solar collector system which establishes efficient transfer of absorbed solar energy to another medium such as air or water.

It is another object of the present invention to provide such a system which is economical to adopt and employ and is compatible with existing solar technology.

These and other objects of the invention will be more fully understood from the following description of the invention on reference to the illustrations appended hereto.

DESCRIPTION OF THE PREFERRED EMBODIMENT

As used herein, the term "gaseous vehicle" refers to air, gas, as well as mixtures of gases including gases mixed with air.

Figure 1:
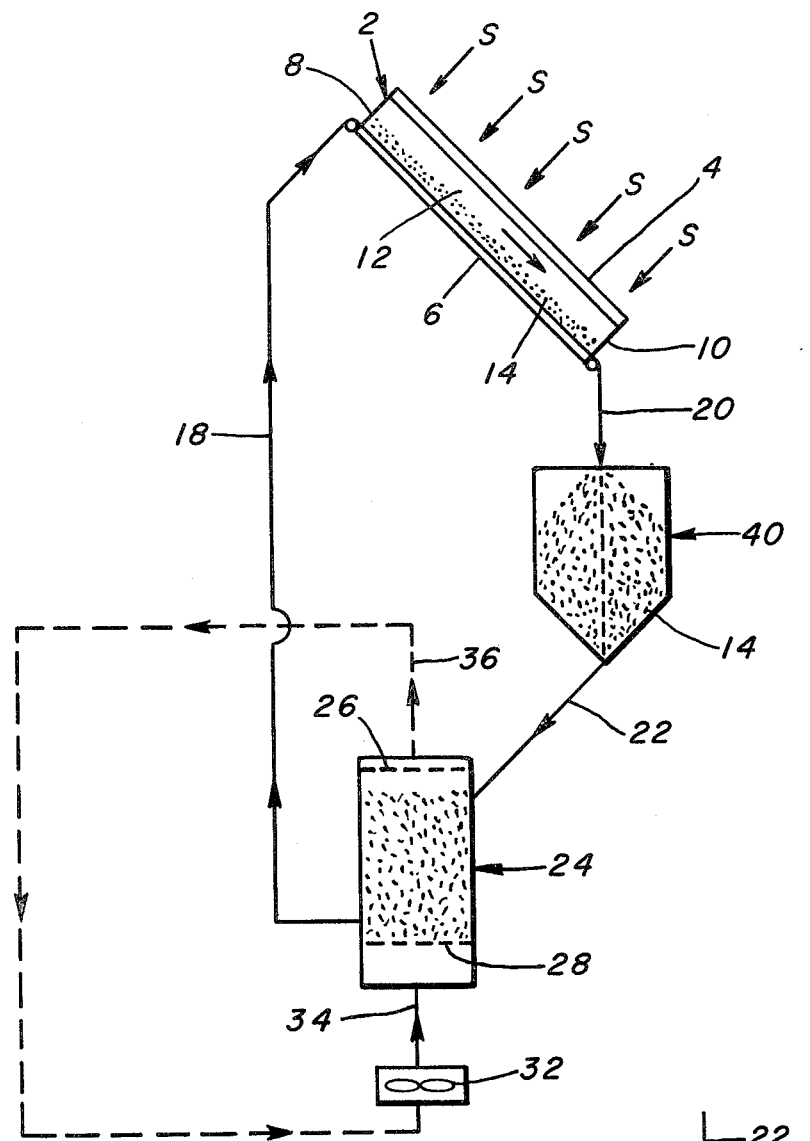
FIG. 1 is a schematic illustration of one preferred form of the present invention.

Referring now more specifically to FIG. 1, there is shown solar collector means 2 which has a front wall 4 which is transparent to solar radiation (illustrated by the arrows S). The solar collector means has a rear wall 6 and open ends 8, 10 which are adapted to communicate with the means for delivering the collecting medium to the interior of the solar collector means 2 for exposure to the solar radiation S.

Within the interior chamber 12 of the solar collector means 2 is received particulate energy collecting means 14 in combination with a gaseous vehicle. The particulate energy collecting means 14 is delivered to the interior of solar collector means 2 by first section 18 of the passageway means with movement of the particulate energy collecting means 14 being effected by conveyor means which will be disclosed hereinafter. The particulate energy collecting means 14 moves through the chamber 12 in the direction indicated by the arrow.

A second section 20, 22 of passageway means 14 delivers the particulate energy collecting means which has absorbed solar heat within solar collector means 2 to heat exchanger means 24. In the form illustrated, the heat exchanger means 24 is a fluidized bed, which may be of a conventional variety. The stream of particulate energy collecting means 14 will pass through the fluidized bed 24 between upper filter 26 and lower filter 28. These filters 26, 28 may conveniently be of the perforated plate or packed filter type to resist passage of particulate matter therethrough. These filters 26, 28 serve to resist particulate energy collecting means 14 being transferred to the medium with which the particulate energy collecting means 14 interfaces in the fluidized bed 24.

In the embodiment illustrated in FIG. 1, it is contemplated that the medium which will absorb heat from the particulate energy collecting means 14 will be air which may be employed for heating, for example. Fan 32 serves to urge returning air into the fluidized bed 24 through duct 34. The air after absorbing heat from the particulate energy collecting means 14 will exit from the fluidized bed 24 through duct 36. While for convenience of illustration, the duct 34, 36 has been shown as being a closed circuit, it will be appreciated that it need not be closed in a structural sense. For example, in a hot air space heating system the air supplied by duct 36 which may have many branches, if desired, may be distributed throughtout the room or rooms through registers and the air returning through duct 34 may be received through return registers.

In order to maximize the efficiency of the system, it is desirable to absorb as much heat in the solar collector means 2 as the solar exposure permits. As a result, the system shown in FIG. 1 may advantageously be provided with storage reservoir 40. This reservoir 40 serves to receive by passageway 20 particulate energy collecting means 14 which has absorbed heat in the solar collector means 2. When activation of the fluidized bed 24 is effected, conveyor means will be employed to permit transfer of the particulate energy collecting means 14 at elevated temperature from storage reservoir 40 to the fluidized bed 24.

In the preferred embodiment of the invention, the particulate energy collecting means 14 being circulated through a closed loop by transport means will be sustantially dry throughout the cycle of operation so as to avoid the problems encountered with liquid systems. Even in the heat exchanger, it is preferred to avoid direct contact between the particulate energy collecting means 14 and substantial quantities of liquid where liquid is the medium to which heat is to be transferred. This is not so that critical humidity controls must be established, but rather that direct contact with large quantities of liquid should be avoided.

Figure 2:
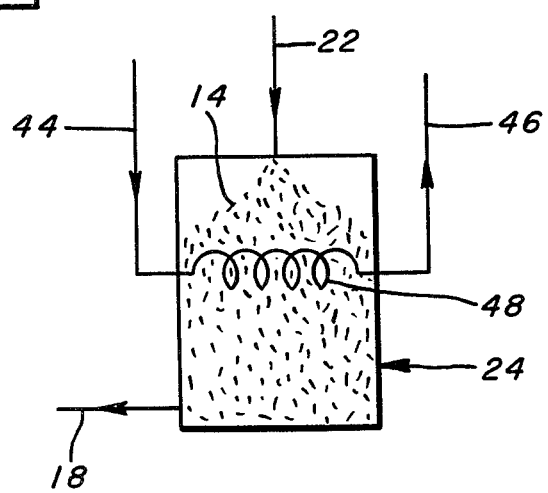
FIG. 2 is a fragmentary schematic showing a form of heat exchanger employing piping to transfer heat to a fluid medium.

Referring now to FIG. 2, there is shown a modification which may be employed in the embodiment of FIG. 1 in addition to or in lieu of the air system provided by ducts 34, 36. In this embodiment it is contemplated that the medium which will receive heat from the particulate energy collecting means 14 will be a liquid, such as water, which is delivered to the fluidized bed 24 by pipe 44 and discharged therefrom by pipe 46 with heat exchange being effected with the assistance of pipe coils 48. This system may be advantageously be employed, for example, for residential or commercial hot water heating or other desired uses where water at elevated temperature is required.

The particulate energy collecting means 14 of the present invention preferably consists of granular or particulate material which is adapted to serve as both a solar collecting means and energy storage means. It is preferred to use a material which has non-toxic characteristics, has adequate heat capacity for heat absorption and storage and is relatively inexpensive. It is also preferred that the particulate materials have high absorptivity for solar radiation, have high heat capacity per unit mass, tend to resist fragmentation and will withstand high operating temperature. Further, it is preferred that the granular material have an irregular surface so as to provide for porosity which is conducive to high absorptivity. Among the preferred particulate energy collecting means are materials selected from the group consisting of sand, rock, alumina, limestone, glass beads, plastic beads, sodium sulfate and sodium sulfate decahydrate. It is also preferred that where practical, the materials be provided with a dark exterior color in order to enhance adsorption of the solar radiation. In order to facilitate maximum efficiency of heat transfer, it is preferred that the average particle size of the particulate energy collecting means 14 be about 0.1 mm to 1.0 mm.

In order to avoid the undesired hazards of freezing, evaporation and leakage, it is preferred that a gaseous vehicle be employed in the transport of the particulate energy collecting means 14 through the system, which is preferably closed. While it will be appreciated that in some embodiments mechanical conveying means may be employed for all or a portion of the transport, the closed system will essentially be devoid of any liquid present in such quantities as to serve as a transport vehicle for the particulate energy collecting means.

In one preferred embodiment, a source of a gaseous vehicle under pressure, created by a compressor, pump or fan is in communication with a section of the passageway means 18, 20, 22 so as to build up pneumatic pressure which serves as the means for transporting the particulate energy collecting means 14 through the system.

Figure 3:
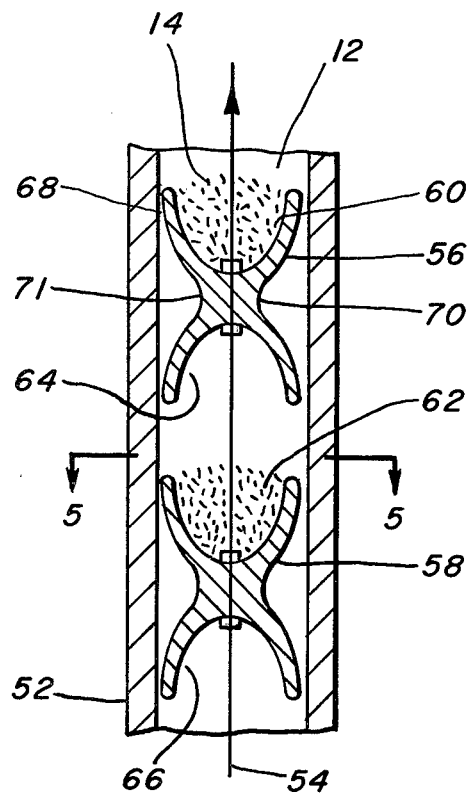
FIG. 3 is a fragmentary cross-sectional illustration of one form of conveyor system contemplated by the present invention.
Figure 5:
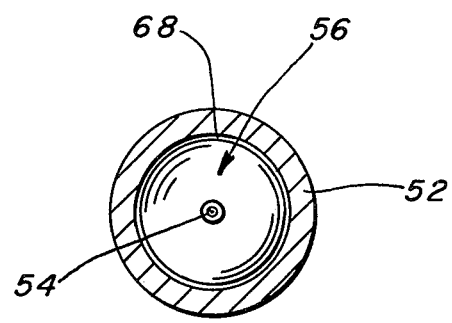
FIG. 5 is a cross-sectional illustration of the conveyor of FIG. 3 taken through 5—5.

Referring now to FIGS. 3 and 5 there is shown a form of conveyor means contemplated by the present invention. The passageway means in this embodiment consists of a pipe 52 which is adapted to cooperate withthe solar collector means 2, the storage reservoir 40, and the heat exchanger 24 to define a closed system for transport of the particulate energy collecting means 14. A cable 54, which is preferably an endless cable, has a plurality of conveyor elements 56, 58 (only two being shown in this view) secured fixedly thereto in relative spaced relationship. In the embodiment shown, the conveyor elements 56, 58 have, respectively, upwardly open recesses 60, 62 within which are received particulate energy collecting means 14. In the section of the conveyor means shown in FIG. 3, the particulate energy collecting means 14 is being transported along the first section of passageway means 18 to deliver the particulate energy collecting means from the heat exchanger 24 to the solar collector means 2.

In the embodiment illustrated in FIG. 3 it is noted that each element 56, 58 has respectively downwardly open recesses 64, 66. It will be appreciated that in the absence of the downwardly open recesses, as the conveyor moves through the second section of the passageway means 20, 22, the particulate energy collecting means 14 would move downwardly through the pipe 52 under the influence of gravity. In the embodiment where the conveyor elements have recesses 64, 66, these recesses will be upwardly open during the passage of the conveyor elements 56, 58 through the second section of passageway means 20, 22. As a result of the weight of the particulate energy collecting means disposed in recesses 64, 68 and the gravitational force imposed thereon, this approach may be used to provide more efficient movement of the conveyor in its orbital path.

Referring still to FIGS. 3 and 5, it is noted that the maximum transverse dimension of the conveyor elements 56, 58 is so related to the interior wall of pipe 52 that a somewhat narrow gap 68 is provided therebetween. This relationship serves to resist undesired tipping of the conveyor elements 56, 58 which would interfere with efficient transport of the particulate energy collecting means 14.

Figure 4:
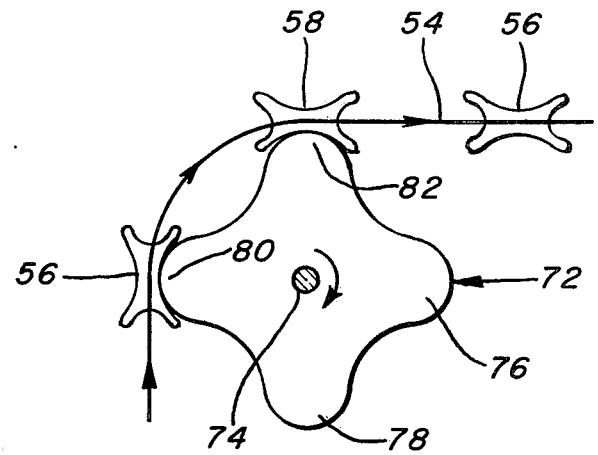
FIG. 4 is a fragmentary illustration showing a preferred form of force applying means for driving the conveyor of FIG. 3.

Referring still to FIG. 3, it is noted that in the form illustrated, the conveyor element 56 has lateral outwardly generally concave surfaces 70, 71. As is shown in FIG. 4, a sprocket 72 which is rigidly secured to a driven shaft 74 has teeth 76, 78, 80, 82 which are adapted to engage the lateral surfaces 70, 71 in driving the conveyor through its orbital path. It is preferred that driven shaft 74 be driven by a variable-speed motor to move the conveyor elements at a relatively low speed. The speed of conveyor movement is preferably such as to maximize efficiency of energy collection in solar collector means 2 and transfer of energy from said particulate energy collecting means 14 in a heat exchanger.

As a substitute for the type of conveyor shown in FIGS. 3 through 5, one might employ an endless belt conveyor having integrally formed or attached pocket-like elements for receipt of particulate energy collecting means 14. The endless belt offers the advantage of low power consumption, quietness, and simplicity. It will also be appreciated that in addition to or in lieu of the preferred conveyor means disclosed herein, other means such as augers, for example, will be readily apparent to those skilled in the art.

For convenience of illustration herein the system has been illustrated in FIG. 1 as having the transport means deliver the particulate energy collecting means 14 to the solar collector means 2 for exposure to solar energy without extensive detail as to how deposit and withdrawal might be accomplished. Many means will be apparent to those skilled in the art. For example, the transport means in the form of a mechanical conveyor, pressured gaseous vehicle or other means or combinations thereof may drop the particulate means on sloped rear wall 6 and permit the particulate means to move downwardly along the wall 6 under the influence of gravity with or without an assist from other conveyor means as it absorbs solar energy. The rear wall 6 may advantageously be rectangular and should have sufficient surface to provide the desired heating capacity.

If desired, a series of perforated distribution plates (not shown) may be fixedly secured within the solar collector means 2 spaced from the rear wall 6. Particulate energy collecting means 14 may be dropped on the upper surface of such plates which are positioned angularly so as to facilitate particle flow on the plates under the influence of gravity with more even distribution of the particulate means being provided as a result of the particle falling through openings in the plates. The plates should be placed over the upper portions of rear wall 6 so as to provide for maximum distance of travel of the particulate means on the solar exposed rear wall 6. With this approach, for example, a mechanical conveyor such as that shown in FIG. 3 through 5 may have a rectangular orbital path around the perimeter of rear wall 6 with the upper reach serving to deliver particulate means to the rear wall 6 either directly or through one or more distribution plates and the lower reach serving to pick up particulate means which have passed over rear wall 6. Alternatively the conveyor may have a first vertical run providing particulate means for the upper portions of the rear wall 6 by at least one distribution plate and a second vertical run adjacent the first receiving particulate means which has passed over the rear wall 6 and is directed toward the second conveyor run by the influence of gravity or by a sloping lower surface in solar collector means 2.

If desired, for use during peak demand periods, additional means above and beyond passageway means 20, 22 (FIG. 1) may be provided to permit an increased rate of delivery of particulate means 14 to heat exchanger 24. For example, one or more additional conduits from storage reservoir 40 to heat exchanger may be provided. For example, a gravity flow duct with a flow control damper may be provided. In this fashion increased delivery of heated particulate means may be provided.

It will be appreciated, therefore, that the present invention provides an efficient, economical and advantageous solar collector system wherein the problems of employing liquids as a collecting medium are eliminated. Also, the system by employing particulate material in the presence of a gaseous vehicle serves to permit the advantageous use of a fluidized bed heat exchanger. The system is readily adapted for use with a wide range of particulate materials having the desired properties and may be employed in connection with both liquid and air media which receive heat from the particulate energy collecting means. The particulate energy collecting means serve both as direct collectors of solar energy and as the storage and transfer media.

It will be appreciated that certain variations may be made to the above-described preferred embodiments without departing from the invention. For example, various other forms of conveyor means may be employed to transport the particulate energy collecting means in combination with the gaseous vehicle. Also, while the fluidized bed heat exchanger is a preferred means, other forms of heat exchangers may be employed. While certain specific suggested uses such as residential heating of air or water or commercial heating of the same have been suggested, it will be appreciated that in addition to space heating of buildings and hot water sources, this system may be used for other beneficial purposes, for example, power generation.

Whereas particular embodiments of the invention have been described above for purposes of illustration, it will be evident to those skilled in the art that numerous variations of the details may be made without departing from the invention as defined in the appended claims.

I claim:

1. A solar collector system comprising
   particulate energy collecting means for receiving solar energy, solar collector means for directly and simultaneously exposing a plurality of said particulate energy collecting means to solar energy, said solar collector means has a first wall transparent to solar energy, said solar collector means defines a path for passage of said particulate energy collecting means therethrough, heat exchanger means for permitting transfer of heat from said particulate energy collecting means to another medium, transport means for delivering said particulate energy collecting means through said solar collector means, from said solar collector means to said heat exchanger means and from said heat exchanger means to said solar collector means, said transport means includes passageway means for defining a path of flow of said particulate energy collecting means and conveying means for moving said particulate energy collecting means through said passageway means, said conveying means includes endless conveyor means disposed within said passageway means, said passageway means connecting said solar collector means with said heat exchanger means for delivering said particulate energy collecting means from said solar collector means to said heat exchanger means and back to said solar collector means, whereby a plurality of said particulate energy collecting means will be heated simultaneously by direct exposure to solar radiation through said first wall as said collecting means moves along said path within said solar collector means, said heat exchanger includes a fluidized bed, conduit means for passing a fluid through said fluidized bed, whereby said particulate energy collecting means will pass through said fluidized bed and yield heat to said fluid, said conduit means have first conduit means for transporting fluid at elevated temperature emerging from said fluidized bed to a heat receiving zone and second conduit means for recirculating said fluid to said fluidized bed after said fluid has yielded at least some of its heat to said heat receiving zone, and said particulate energy collecting means has an average particulate size of about 0.1 mm. to 1.0 mm.

2. The solar collector system of claim 1 wherein said heat exchanger means includes a fluidized bed of said particulate energy collecting means and liquid containing means for transferring liquid into and out of said heat exchanger means to permit transfer of heat from said particulate energy collecting means to said liquid without direct contact between said particulate energy collecting means and said liquid.

3. The solar collector system of claim 1 wherein said particulate energy collecting means is selected from the group consisting of sand, rock, alumina, limestone, glass beads, plastic beads, sodium sulfate, and sodium sulfate decahydrate.

4. The solar collector system of claim 1 wherein said conveying means include an endless belt containing integrally formed pockets for receipt and discharge of said particulate energy collecting means.

5. A solar collector system comprising particulate energy collecting means for receiving solar energy, solar collector means for directly and simultaneously exposing a plurality of said particulate energy collecting means to solar energy, said solar collector means has a first wall transparent to solar energy, said solar collector means defines a path for passage of said particulate energy collecting means therethrough, heat exchanger means for permitting transfer of heat from said particulate energy collecting means to another medium, transport means for delivering said particulate energy collecting means through said solar collector means, from said solar collector means to said heat exchanger means and from said heat exchanger means to said solar collector means, said transport means includes passageway means for defining a path of flow of said particulate energy collecting means and conveying means for moving said particulate energy collecting means through said passageway means, said conveying means includes endless conveyor means disposed within said passageway means, said passageway means connecting said solar collector means with said heat exchanger means for delivering said particulate energy collecting means from said solar collector means to said heat exchanger means and back to said solar collector means, whereby a plurality of said particulate energy collecting means will be heated simultaneously by direct exposure to solar radiation through said first wall as said collecting means moves along said path within said solar collector means, said conveyor means includes a driven endless cable having a plurality of conveyor elements secured thereto, said conveyor elements have at least one recess for receipt of said particulate energy collecting means, said passageway means has a first portion for raising the elevation of said particulate energy collecting means and a second portion for lowering the elevation of said particulate energy collecting means, and said conveyor element recess adapted to be generally upwardly open during movement through said first portion of said passageway means and generally downwardly open during movement through said second portion of said passgeway means, whereby said conveyor element will raise said particulate energy collecting means within said first portion and permit gravity to assist with lowering said particulate energy collecting means within said second portion.

6. The solar collector system of claim 5 wherein said heat exchanger includes a fluidized bed, and conduit means for passing a fluid through said fluidized bed, whereby said particulate energy collecting means will pass through said fluidized bed and yield heat to said fluid.

7. The solar collector system of claim 6 wherein said conduit means have first conduit means for transporting fluid at elevated temperature emerging from said fluidized bed to a heat receiving zone and second conduit means for recirculating said fluid to said fluidized bed after said fluid has yielded at least some of its heat to said heat receiving zone.

8. The solar collector system of claim 7 wherein said fluid is air, and
said conduit means includes air ducts.

9. The solar collector system of claim 5 wherein energy storage reservoir means for storing said particulate energy collecting means are disposed in communication with said passageway means.

10. The solar collector system of claim 9 wherein said energy storage reservoir means are disposed within said passageway means intermediate said solar collector means and said heat exchanger means.

11. The solar collector system of claim 5 wherein said conveyor elements have a pair of recesses facing in generally opposite directions, whereby a first said recess will contain said particulate energy collecting means while said conveyor element moves through said first portion of said passageway means and a said second recess for containing said particulate energy collecting means while said conveyor element moves through said second portion of said passageway means thereby permitting gravity to urge said conveyor means along its orbital path.

12. The solar collector system of claim 11 wherein driven sprocket means engage said conveyor elements for moving said conveyor means within its orbit.

13. The solar collector system of claim 11 wherein the maximum transverse dimension of said conveyor elements is so related to the minimum interior opening defining dimension of said passageway means as to permit ready relative movement therebetween while said passageway means serves to resist undesired discharge of said particulate energy collecting means from said recesses of said conveyor elements during movement of said elements through said passageway means.

* * * * *